(12) United States Patent
Negishi

(10) Patent No.: US 8,592,332 B2
(45) Date of Patent: *Nov. 26, 2013

(54) OPTICAL GLASS, PREFORM FOR PRECISION PRESS MOLDING, OPTICAL ELEMENT, METHOD FOR MANUFACTURING OPTICAL ELEMENT

(75) Inventor: Tomoaki Negishi, Shinjuku-ku (JP)

(73) Assignee: Hoya Corporation, Tokyo (JP)

(*) Notice: Subject to any disclaimer, the term of this patent is extended or adjusted under 35 U.S.C. 154(b) by 195 days.

This patent is subject to a terminal disclaimer.

(21) Appl. No.: 13/035,660

(22) Filed: Feb. 25, 2011

(65) Prior Publication Data

US 2011/0257002 A1  Oct. 20, 2011

(30) Foreign Application Priority Data

Apr. 15, 2010 (JP) .................. 2010-094363

(51) Int. Cl.
 C03C 3/155 (2006.01)
 C03C 3/15 (2006.01)
 C03C 3/066 (2006.01)

(52) U.S. Cl.
 USPC .................. 501/51; 501/50; 501/79

(58) Field of Classification Search
 USPC .............................. 501/50, 51, 79
 See application file for complete search history.

(56) References Cited

U.S. PATENT DOCUMENTS

| 7,622,409 B2* | 11/2009 | Hayashi | 501/50 |
| 7,655,585 B2* | 2/2010 | Hayashi | 501/51 |
| 7,855,158 B2* | 12/2010 | Fujiwara | 501/79 |
| 2005/0197243 A1 | 9/2005 | Hayashi | |
| 2007/0049483 A1 | 3/2007 | Hayashi | |
| 2008/0293556 A1* | 11/2008 | Fujiwara | 501/78 |
| 2011/0257001 A1* | 10/2011 | Negishi | 501/42 |

FOREIGN PATENT DOCUMENTS

| JP | 2005-247613 A | 9/2005 |
| JP | 2006-111482 A | 4/2006 |
| JP | 2007-063071 A | 3/2007 |
| JP | 2008-201661 A | 9/2008 |
| JP | 2010-030879 A | 2/2010 |
| WO | 2007/119565 A1 | 10/2007 |

OTHER PUBLICATIONS

European Search Report corresponding to European Patent Application No. 11156170.0, dated Aug. 1, 2011.
Office Action issued in corresponding Japanese Patent Application No. 2010-094363 dated Oct. 1, 2013.

\* cited by examiner

*Primary Examiner* — Anthony J Green
*Assistant Examiner* — Elizabeth A Bolden
(74) *Attorney, Agent, or Firm* — Sughrue Mion, PLLC

(57) ABSTRACT

The present invention relates to an optical glass with a refractive index nd of 1.89 or higher and an Abbé number v(nu)d of 28 to 36; a preform for precision press molding and an optical element that are comprised of this glass; and a method for manufacturing the optical element.

12 Claims, No Drawings

OPTICAL GLASS, PREFORM FOR PRECISION PRESS MOLDING, OPTICAL ELEMENT, METHOD FOR MANUFACTURING OPTICAL ELEMENT

TECHNICAL FIELD

The present invention relates to an optical glass with a refractive index nd of 1.89 or higher and an Abbé number v(nu)d of 28 to 36; a preform for precision press molding and an optical element that are comprised of this glass; and a method for manufacturing the optical element.

BACKGROUND ART

There is high demand for high-refractive-index, low-dispersion optical glasses as materials for optical elements such as various lenses. For example, such lenses can be combined with high-refractive-index, high-dispersion lenses to constitute compact, highly functional optical systems for the correction of chromatic aberration.

Employing an aspherical, optically functional surface in a high-refractive-index, low-dispersion lens makes it possible to obtain various optical systems of even greater functionality and compactness.

Precision press molding is known as a method of efficiently manufacturing optical elements of glass that are extremely time-consuming and costly to manufacture by processes such as grinding and polishing, such as aspherical lenses. A high-refractive-index, low-dispersion optical glass that is employed in precision press molding is disclosed in JP 2005-247613A (hereinafter referred to Patent Reference 1).

The object of Patent Reference 1 is to provide an optical glass, intended for the manufacturing of glass optical elements of high shape precision with high productivity, that has a high refractive index and low dispersion with a low glass transition temperature, and that softens at low temperatures permitting precision press molding. It discloses an optical glass comprised of essential components in the form of $B_2O_3$, $La_2O_3$, $Gd_2O_3$, and ZnO that has a refractive index (nd) exceeding 1.86, an Abbé number (vd) of less than 35, and a glass transition temperature (Tg) of 630° C. or lower.

SUMMARY OF INVENTION

The optical glass that is disclosed in Patent Reference 1 comprises rare earth components such as $La_2O_3$, $Gd_2O_3$, and $Y_2O_3$ that are advantageous for raising the refractive index and lowering dispersion. Components such as ZnO, $Ta_2O_5$, $TiO_2$, $Nb_2O_5$, and $WO_3$ that are advantageous for further raising the refractive index are incorporated.

The glass that is disclosed in Patent Reference 1 that contains relatively large quantities of rare earth components and components that raise the refractive index, such as $TiO_2$ and $WO_3$ tends to exhibit low glass stability, a high glass transition temperature, and a high liquidus temperature. As a result, when molding preforms for precision press molding with this glass, there is room for improvement in terms of preventing the precipitation of crystals and suppressing the generation of striae.

The first object of the present invention is to provide a high-refractive-index, low-dispersion optical glass that solves the above problems and permits the stable production of high-quality optical elements. The second object of the present invention is to provide a preform for precision press molding and an optical element that are comprised of this optical glass, and a method for manufacturing the optical element.

The present invention is as follows:

[1]
An optical glass, comprising, denoted as cation percentages:
1 to 10% of $Si^{4+}$,
25 to 45% of $B^{3+}$,
0 to 10% of $Li^+$,
0 to 5% of $Na^+$,
0 to 5% of $K^+$,
0 to 5% of $Mg^{2+}$,
0 to 5% of $Ca^{2+}$,
0 to 5% of $Si^{2+}$,
0 to 5% of $Ba^{2+}$,
10 to 40% of $Zn^{2+}$,
10 to 25% of $La^{3+}$,
1 to 15% of $Gd^{3+}$,
0 to 5% of $Y^{3+}$,
0 to 5% of $Yb^{3+}$,
0 to 3% of $Zr^{4+}$,
1 to 15% of $Ti^{4+}$,
0 to 5% of $Nb^{5+}$,
0 to 5% of $Ta^{5+}$,
1 to 20% of $W^{6+}$,
0 to 5% of $Te^{4+}$,
0 to 5% of $Ge^{4+}$,
0 to 5% of $Bi^{3+}$, and
0 to 5% of $Al^{3+}$;
wherein the cation ratio of $(B^{3+}/(B^{3+}+Si^{4+}))$ is 0.70 to 0.96;
the cation ratio of $(B^{3+}/(La^{3+}+Gd^{3+}+Y^{3+}))$ is 1.0 to 2.0;
the cation ratio of $((B^{3+}+Si^{4+})/(La^{3+}+Gd^{3+}+Y^{3+}))$ is 1.0 to 3.0;
the cation ratio of $(B^{3+}/(Ti^{4+}+Nb^{5+}+Ta^{5+}+W^{6+}))$ is 0.8 to 4.0;
the cation ratio of $((B^{3+}+Si^{4+})/(Ti^{4+}+Nb^{5+}+Ta^{5+}+W^{6+}))$ is 1.5 to 5.0;
the cation ratio of $(Zn^{2+}/(Zn^{2+}+Mg^{2+}+Ca^{2+}+Sr^{2+}+Ba^{2+}))$ is 0.8 to 1.0;
the cation ratio of $((La^{3+}+Gd^{3+}+Y^{3+})/(Ti^{4+}+Nb^{5+}+Ta^{5+}+W^{6+}))$ is 1.0 to 3.0;
the cation ratio of $Ti^{4+}/W^{6+}$ is 0.1 to 4.0;
the cation ratio of $((Ti^{4+}+W^{6+})/(Ti^{4+}+Nb^{5+}+Ta^{5+}+W^{6+}))$ is 0.8 to 1.0;
having a refractive index nd of 1.89 or higher and an Abbé number vd of 28 to 36.

[2]
The optical glass according to [1], wherein the content of $Nb^{5+}$ and $Ta^{5+}$ is 0 cation %.
[3]
The optical glass according to [2], wherein the cation ratio of $(B^{3+}/(La^{3+}+Gd^{3+}+Y^{3+}))$ is 1.2 to 1.51.
[4]
The optical glass according to [1], comprising, denoted as cation percentages:
3 to 7% of $Si^{4+}$,
29 to 38% of $B^{3+}$,
0% of $Li^+$,
0% of $Na^+$,
0% of $K^+$,
0% of $Mg^{2+}$,
0% of $Ca^{2+}$,
0% of $Sr^{2+}$,
0% of $Ba^{2+}$,
18 to 32% of $Zn^{2+}$,
14 to 18% of $La^{2+}$,
5 to 10% of $Gd^{3+}$,
0% of $Y^{3+}$,
0% of $Yb^{3+}$, 0 to 0.8% of $Zr^{4+}$,
4 to 9% of $Ti^{4+}$,
0% of $Nb^{5+}$,
0% of $Ta^{5+}$,
4 to 10% of $W^{6+}$,
0% of $Te^{4+}$,
0% of $Ge^{4+}$,
0% of $Bi^{3+}$, and
0% of $Al^{3+}$;
wherein the cation ratio of $(B^{3+}/(B^{3+}+Si^{4+}))$ is 0.80 to 0.93;
the cation ratio of $(B^{3+}/(La^{3+}+Gd^{3+}+Y^{3+})$ is 1.20 to 1.51;
the cation ratio of $((B^{3+}+Si^{4+})/(La^{3+}+Gd^{3+}+Y^{3+})$ is 1.4 to 1.7;
the cation ratio of $(B^{3+}/(Ti^{4+}+Nb^{5+}+Ta^{5+}+W^{6+})$ is 2.20 to 2.62;
the cation ratio of $((B^{3+}+Si^{4+})/(Ti^{4+}+Nb^{5+}+Ta^{5+}+W^{6+})$ is 2.3 to 3.0;
the cation ratio of $(Zn^{2+}/(Zn^{2+}+Mg^{2+}+Ca^{2+}+Sr^{2+}+Ba^{2+})$ is 1.0;
the cation ratio of $((La^{3+}+Gd^{3+}+Y^{3+})/(Ti^{4+}+Nb^{5+}+Ta^{5+}+W^{6+}))$ is 1.6 to 2.1;
the cation ratio of $Ti^{4+}/W^{6+}$ is 0.1 to 1.9; and
the cation ratio of $((Ti^{4+}+W^{6+})/(Ti^{4+}+Nb^{5+}+Ta^{5+}+W^{6+})$ is 1.0.

[5]
The optical glass according to any one of [1] to [4], wherein the $Si^{4+}$ content is 4 to 5%.

[6]
The optical glass according to any one of [1] to [5], wherein the glass transition temperature is less than 630° C.

[7]
The optical glass according to any one of [1] to [6], wherein the liquidus temperature is 1,200° C. or lower.

[8]
The optical glass according to any one of [1] to [6], wherein the liquidus temperature is 1,050° C. or lower and the refractive index nd is 1.90 or higher.

[9]
The optical glass according to any one of [1] to [8], wherein the partial dispersion ratio Pg,F is 0.57 to 0.62.

[10]
A preform for precision press molding, comprised of the optical glass according to any one of [1] to [9].

[11]
An optical element comprised of the optical glass according to any one of [1] to [9].

[12]
A method for manufacturing an optical element, comprised of heating the preform for precision press molding according to [10] and employing a pressing mold to conduct precision press molding.

The present invention provides a high-refractive-index, low-dispersion optical glass with good thermal stability, making it possible to stably supply high-quality preforms for precision press molding. The present invention also provides an optical element and a preform for precision press molding employing this optical glass, and a method for manufacturing the optical element.

MODES FOR CARRYING OUT THE INVENTION

The optical glass of the present invention is described in detail below. Unless specifically stated otherwise, the contents and combined contents of the various cation components given below denote cation percentages, and ratios of these contents denote cation ratios.

$Si^{4+}$ functions to increase the viscosity of the glass, enhance the thermal stability of the glass, and enhance the moldability of the glass. However, when incorporated in excessive quantity, it lowers the refractive index and raises the temperature during precision press molding. When the $Sr^+$ content exceeds 10%, the refractive index drops, and the glass viscosity increases, causing the temperature to rise during precision press molding. Accordingly, the $Si^{4+}$ content is set to within a range of 1 to 10%. The upper limit of the $Sr^+$ content is desirably 9% or lower, preferably 8% or lower, and more preferably, 7% or lower. The lower limit of the $Si^{4+}$ content is desirably 1.5% or higher, preferably 2.0% or higher, more preferably 2.5% or higher, and still more preferably, 3.0% or higher. The $Sr^+$ content optimally falls within a range of 4 to 5%.

$B^{3+}$ functions to increase the thermal stability of the glass and lower the liquidus temperature. However, it is a highly volatile component. Accordingly, when incorporated in excessive quantity, the refractive index drops, the level of volatization during glass molding increases, and striae tend to generate. Accordingly, the $B^{3+}$ content is set to within a range of 25 to 45%. The upper limit of the $B^{3+}$ content is desirably 42% or lower, preferably 40% or lower, more preferably 39% or lower, and still more preferably, 38% or lower. The lower limit of the $B^{3+}$ content is desirably 26% or higher, preferably 27% or higher, more preferably 28% or higher, and still more preferably, 29% or higher.

$Li^+$ has a substantial effect in lowering the glass transition temperature, but lowers the refractive index and reduces thermal stability when incorporated in excessive quantity. Among the alkali metal components, it is the most advantageous component for maintaining a high refractive index characteristic. However, when the $Li^+$ content exceeds 10%, the refractive index drops and the thermal stability of the glass tends to decrease. Accordingly, the $Li^+$ content is set to the range of 0 to 10%. The $Li^+$ content is desirably 0 to 8%, preferably 0 to 6%, more preferably 0 to 3%, and still more preferably, none is incorporated at all.

$Na^+$ and $K^+$ have the effect of lowering the glass transition temperature, but also lower the refractive index and reduce glass stability when incorporated in excessive quantities. When the content of either $Na^+$ or $K^+$ exceeds 5%, the refractive index drops and the thermal stability of the glass tends to decrease. Accordingly, the content of each of $Na^+$ and $K^+$ is set to within a range of 0 to 5%. The $Na^+$ content is desirably 0 to 4%, preferably 0 to 3%, and more preferably, none is incorporated at all. The $K^+$ content is desirably 0 to 4%, preferably 0 to 3%, and more preferably, none is incorporated at all.

Each of $Mg^{2+}$, $Ca^{2+}$, $Sr^{2+}$, and $Ba^{2+}$ functions to enhance meltability, but decreases the stability of the glass when introduced in excessive quantity. Accordingly, the content of each of the components $Mg^{2+}$, $Ca^{2+}$, $Sr^{2+}$, and $Ba^{2+}$ is set to a range of 0 to 5%. The range of each of the components $Mg^{2+}$, $Ca^{2+}$, $Sr^{2+}$, and $Ba^{2+}$ is desirably 0 to 4%, preferably 0 to 3%, and more preferably, none is incorporated at all.

$Zn^{2+}$ functions to lower the glass transition temperature while maintaining a high refractive index, as well as enhancing meltability. However, it reduces the stability of the glass when incorporated in excessive quantity. It is difficult to achieve these effects when the $Zn^{2+}$ content is less than 10%, and the thermal stability of the glass tends to decrease when 40% is exceeded. Accordingly, the $Zn^{2+}$ content is set to a range of 10 to 40%. The upper limit of the $Zn^{2+}$ content is desirably 38% or lower, preferably 36% or lower, more preferably 34% or lower, and still more preferably, 32% or lower. The lower limit of the $Zn^{2+}$ content is desirably 12% or higher, preferably 14% or higher, more preferably 16% or higher, and still more preferably, 18% or higher.

$La^{3+}$ is a component that functions to raise the refractive index while maintaining low dispersion, but tends to lower the stability of the glass and raise the glass transition temperature when incorporated in excessive quantity. It is difficult to achieve these effects when the $La^{3+}$ content is less than 10%, and the thermal stability of the glass tends to decrease and the glass transition temperature tends to rise when 25% is exceeded. Accordingly, the $La^{3+}$ content is set to a range of 10 to 25%. The upper limit of the $La^{3+}$ content is desirably 24% or lower, preferably 22% or lower, more preferably 20% or lower, and still more preferably, 18% or lower. The lower limit of the $La^{3+}$ content is desirably 11% or higher, preferably 12% or higher, more preferably 13% or higher, and still more preferably, 14% or higher.

$Gd^{3+}$ is a component that functions to raise the refractive index while maintaining low dispersion, but tends to lower the stability of the glass and raise the glass transition temperature when incorporated in excessive quantity. This low dispersion and high refractive index cannot be achieved at a $Gd^{3+}$ content of less than 1%, and the stability of the glass tends to decrease and the glass transition temperature tends to rise when 15% is exceeded. The $Gd^{3+}$ content is set to a range of 1 to 15%. The upper limit of the $Gd^{3+}$ content is desirably 14% or lower, preferably 13% or lower, more preferably 12% or lower, and still more preferably, 10% or lower. The lower limit of the $Gd^{3+}$ content is desirably 2% or higher, preferably 3% or higher, more preferably 4% or higher, and still more preferably, 5% or higher.

$Y^{3+}$ is a component that functions to raise the refractive index while maintaining low dispersion. When incorporated in excessive quantity, the thermal stability of the glass tends to decrease and the glass transition temperature tends to rise. Thus, the $Y^{3+}$ content is set to a range of 0 to 5%. The $Y^{3+}$ content is desirably 0 to 4%, preferably 0 to 3%, and more preferably, none is incorporated at all.

$Yb^{3+}$ is a component that functions to raise the refractive index while maintaining low dispersion. When incorporated in excessive quantity, the thermal stability of the glass tends to decrease and the glass transition temperature tends to rise. Thus, the $Yb^{3+}$ content is set to a range of 0 to 5%. The $Yb^{3+}$ content is desirably 0 to 4%, preferably 0 to 3%, and more preferably, none is incorporated at all.

$Zr^{4+}$ is a component that functions to raise the refractive index. When the $Zr^{4+}$ content exceeds 3%, the stability of the glass tends to decrease and the liquidus temperature tends to rise. Accordingly, the $Zr^{4+}$ content is set to a range of 0 to 3%. The $Zr^{4+}$ content is desirably 0 to 1.5%, preferably 0 to 1.0%, and more preferably, 0 to 0.8%.

$Ti^{4+}$ is a component that raises the refractive index. However, when incorporated in excessive quantity, it reduces the stability of the glass and colors the glass. Accordingly, The $Ti^+$ content is set to a range of 1 to 15%. The upper limit of the $Ti^{4+}$ content is desirably 14% or lower, preferably 13% or lower, more preferably 12% or lower, still more preferably 11% or lower, and even more preferably, 9% or lower. The lower limit of the $Ti^+$ content is desirably 2% or higher, preferably 3% or higher, and more preferably, 4% or higher.

$Nb^{5+}$ is a component that is able to raise the refractive index even more than $W^{6+}$. However, it lowers thermal stability and raises the liquidus temperature when incorporated in excessive quantity. Accordingly, the $Nb^{6+}$ content is set to 0 to 5%. The $Nb^{6+}$ content is desirably 0 to 4%, preferably 0 to 3%, and more preferably, none is incorporated at all.

$Ta^{5+}$ is a component that raises the refractive index, exhibiting lower dispersion than $Tr^{4+}$ and $W^{6+}$, which are components that similarly raise the refractive index. However, it reduces thermal stability and lowers the liquidus temperature when incorporated in excessive quantity. Accordingly, the $Ta^{5+}$ content is set to a range of 0 to 5%. The $Ta^{5+}$ content is desirably 0 to 4%, preferably 0 to 3%, and more preferably, none is incorporated at all.

Having a $Nb^{5+}$ content and a $Ta^{5+}$ content that are both 0 cation % is desirable from the perspective of the stability of the glass. Good moldability is achieved in an optical glass with a $Nb^{5+}$ content and a $Ta^{5+}$ content that are both 0 cation %. As set forth further below, setting the cation ratio of $(B^{3+}/(La^{3+}+Gd^{3+}+Y^{3+}))$ to 1.0 to 2.0 when both the $Nb^{5+}$ content and $Ta^{5+}$ content are both 0 in the optical glass of the present invention achieves a refractive index of 1.89 or higher, desirably 1.90 or higher.

$W^{6+}$ is a component that functions to raise the refractive index, enhance the thermal stability of the glass, and lower the liquidus temperature. However, it tends to lower the thermal stability of the glass and color the glass when incorporated in excessive quantity. Accordingly, the $W^{6+}$ content is set to a range of 1 to 20%. The upper limit of the $W^{6+}$ content is desirably 18% or lower, preferably 16% or lower, more preferably 14% or lower, still more preferably 12% or lower, and even more preferably, 10% or lower. The lower limit of the $W^{6+}$ content is desirably 2% or higher, preferably 3% or higher, and more preferably, 4% or higher.

$Te^{4+}$ is a component that functions to raise the refractive index and increase the thermal stability of the glass. However, it reduces the thermal stability of the glass when incorporated in excessive quantity. Out of concern for the burden on the environment, it is desirable to reduce the quantity of $Te^{4+}$ employed. Accordingly, the $Te^{4+}$ content is set to a range of 0 to 5%. The $Te^{4+}$ content is desirably 0 to 4%, preferably 0 to 3%, and more preferably, none is incorporated at all.

$Ge^{4+}$ is a component that functions to raise the refractive index and enhance the thermal stability of the glass. However, it lowers the thermal stability of the glass when incorporated in excessive quantity. Among materials that are employed as glass components, $Ge^{4+}$ is an extremely expensive component. From the perspective of keeping down manufacturing costs, the quantity employed is desirably kept low. Accordingly, the $Ge^{4+}$ content is set to a range of 0 to 5%. The $Ge^{4+}$ content is desirably 0 to 4%, preferably 0 to 3%, and more preferably, none is incorporated at all.

$Bi^{3+}$ is a component that functions to raise the refractive index and enhance the thermal stability of the glass. However, it tends to lower the thermal stability of the glass and color the glass when incorporated in excessive quantity. Accordingly, the $Bi^{3+}$ content is set to a range of 0 to 5%. The $Bi^{3+}$ content is desirably 0 to 4%, preferably 0 to 3%, and more preferably, none is incorporated at all.

$Al^{3+}$ is a component that functions to enhance the thermal stability and chemical durability of the glass. However, it lowers the refractive index and tends to lower the thermal stability of the glass when incorporated in excessive quantity. Accordingly, the $Al^{3+}$ content is set to a range of 0 to 5%. The $Al^{3+}$ content is desirably 0 to 4%, preferably 0 to 3%, and more preferably, none is incorporated at all.

The cation ratio of $B^{3+}$ to the combined quantity of $B^{3+}$ and $Si^{4+}$, $(B^{3+}/(B^{3+}+Si^{4+}))$, is set to 0.70 to 0.96. Below the lower limit of this ratio, it becomes difficult to achieve desired optical characteristics and the liquidus temperature rises. When the upper limit of this ratio is exceeded, the thermal stability of the glass decreases. The upper limit of the cation ratio of $(B^{3+}/(B^{3+}+Si^{4+}))$ is desirably 0.95 or lower, preferably 0.94 or lower, more preferably 0.93 or lower, and still more preferably, 0.92 or lower. The lower limit is desirably 0.72 or higher, preferably 0.75 or higher, more preferably 0.78 or higher, and still more preferably, 0.8 or higher.

When the cation ratio of $B^{3+}$ to the combined quantity of $La^{3+}$, $Gd^{3+}$, and $Y^{3+}$, $(B^{3+}/(La^{3+}+Gd^{3+}+Y^{3+}))$, is less than 1.0, the thermal stability of the glass decreases and the liquidus temperature rises. When 2.0 is exceeded, it becomes difficult to maintain desired optical characteristics. Thus, the cation ratio of $(B^{3+}/(La^{3+}+Gd^{3+}+Y^{3+}))$ is set to 1.0 to 2.0. The upper limit of the cation ratio $(B^{3+}/(La^{3+}+Gd^{3+}+Y^{3+}))$ is desirably 1.9 or lower, preferably 1.8 or lower, more preferably 1.7 or lower, still more preferably 1.6 or lower, and optimally, 1.51 or lower. The lower limit is desirably 1.1 or higher, preferably 1.2 or higher, and more preferably, 1.3 or higher.

When the cation ratio of the combined quantity of $B^{3+}$ and $Si^{4+}$ to the combined quantity of $La^{3+}$, $Gd^{3+}$, and $Y^{3+}$, $((B^{3+}+Si^{4+})/(La^{3+}+Gd^{3+}+Y^{3+}))$, is less than 1.0, the thermal stability of the glass decreases and the liquidus temperature rises. When 3.0 is exceeded, it becomes difficult to maintain the desired optical characteristics. Thus, the cation ratio of $((B^{3+}+Si^{4+})/(La^{3+}+Gd^{3+}+Y^{3+}))$ is set to a range of 1.0 to 3.0. The upper limit of the cation ratio of $((B^{3+}+Si^{4+})/(La^{3+}+Gd^{3+}+Y^{3+}))$ is desirably 2.5 or lower, preferably 2.2 or lower, more preferably 2.0 or lower, still more preferably 1.8 or lower, and even more preferably, 1.7 or lower. The lower limit is desirably 1.1 or higher, preferably 1.2 or higher, more preferably 1.3 or higher, and still more preferably, 1.4 or higher.

The cation ratio of $B^{3+}$ to the combined quantity of $Ti^{4+}$, $Nb^{5+}$, $Ta^{5+}$, and $W^{6+}$, $(B^{3+}/(Ti^{4+}+Nb^{5+}+Ta^{5+}+W^{6+}))$, is set to 0.8 to 4.0. The upper limit of the cation ratio of $(B^{3+}/(Ti^{4+}+Nb^{5+}+Ta^{5+}+W^{6+}))$ is desirably 3.7 or lower, preferably 3.5 or lower, more preferably 3.3 or lower, still more preferably 3.1 or lower, even more preferably, 3.0 or lower, and most preferably, 2.62 or lower. The lower limit is desirably 1.0 or higher, preferably 1.5 or higher, more preferably 1.8 or higher, still more preferably, 2.0 or higher, and most preferably 2.20 or higher.

The cation ratio of the combined quantity of $B^{3+}$ and $Sr^{4+}$ to the combined quantity of $Ti^{4+}$, $Nb^{5+}$, $Ta^{5+}$, and $W^{6+}$, $((B^{3+}+Si^{4+})/(Ti^{4+}+Nb^{5+}+Ta^{5+}+W^{6+}))$, is set to 1.5 to 5.0. At below the lower limit of this ratio, the thermal stability of the glass decreases and the liquidus temperature rises. At above the upper limit of this ratio, it becomes difficult to achieve the desired optical characteristics. The upper limit of the cation ratio of $((B^{3+}+Si^{4+})/(Ti^{4+}+Nb^{5+}+Ta^{5+}+W^{6+}))$ is desirably 4.5 or lower, preferably 4.0 or lower, more preferably 3.5 or lower, still more preferably 3.2 or lower, and even more preferably, 3.0 or lower. The lower limit is desirably 1.5 or higher, preferably 1.7 or higher, more preferably 2.0 or higher, and still more preferably, 2.3 or higher.

Among the divalent metal components of $Zn^{2+}$, $Mg^{2+}$, $Ca^{2+}$, $Sr^{2+}$, and $Ba^{2+}$, $Zn^{2+}$ is a good component that functions to lower the glass transition temperature while maintaining a high refractive index characteristic. The cation ratio of the content of $Zn^{2+}$ to the combined content of $Zn^{2+}$, $Mg^{2+}$, $Ca^{2+}$, $Sr^{2+}$, and $Ba^{2+}$, $(Zn^{2+}/(Zn^{2+}+Mg^{2+}+Ca^{2+}+Sr^{2+}+Ba^{2+}))$, is set to a range of 0.8 to 1.0. The cation ratio of $(Zn^{2+}/(Zn^{2+}+Mg^{2+}+Ca^{2+}+Sr^{2+}+Ba^{2+}))$ is desirably 0.85 to 1.00, preferably 0.90 to 1.00, more preferably 0.95 to 1.00, and still more preferably, 1.00.

The cation ratio of the combined quantity of $La^{3+}$, $Gd^{3+}$, and $Y^{3+}$ to the combined quantity of $Ti^{4+}$, $Nb^{5+}$, $Ta^{5+}$, and $W^{6+}$, $((La^{3+}+Gd^{3+}+Y^{3+})/(Ti^{4+}+Nb^{5+}+Ta^{5+}+W^{6+}))$, is set to 1.0 to 3.0. At below the lower limit, it becomes difficult to achieve the desired optical characteristics (becomes difficult to achieve low dispersion). When the upper limit is exceeded, the thermal stability of the glass decreases and the liquidus temperature rises. The upper limit of the cation ratio of $((La^{3+}+Gd^{3+}+Y^{3+})/(Ti^{4+}+Nb^{5+}+Ta^{5+}+W^{6+}))$ is desirably 2.8 or lower, preferably 2.6 or lower, more preferably 2.4 or lower, still more preferably 2.2 or lower, and even more preferably, 2.1 or lower. The lower limit is desirably 1.2 or higher, preferably 1.3 or higher, more preferably 1.4 or higher, still more preferably 1.5 or higher, and even more preferably, 1.6 or higher.

The cation ratio of $Ti^{4+}/W^{6+}$ is set to 0.1 to 4.0. Below the lower limit of this range, it becomes difficult to achieve the desired optical characteristics. When the upper limit of this range is exceeded, the thermal stability decreases and the liquidus temperature rises. The upper limit of the cation ratio of $Ti^{4+}/W^{6+}$ is desirably 3.9 or lower, preferably 3.8 or lower, more preferably 3.7 or lower, still more preferably 3.6 or lower, even more preferably, 3.5 or lower, further preferably 3.0 or lower, further more preferably 2.5 or lower, and most preferably, 1.9 or lower. The lower limit is desirably 0.2 or higher, preferably 0.3 or higher, more preferably 0.35 or higher, still more preferably 4.0 or higher, and even more preferably, 0.5 or higher.

The cation ratio of the combined quantity of $Ti^{4+}$ and $W^{6+}$ to the combined quantity of $Ti^{4+}$, $Nb^{5+}$, $Ta^{5+}$, and $W^{6+}$, $((Ti^{4+}+W^{6+})/(Ti^{4+}+Nb^{5+}+Ta^{5+}+W^{6+}))$, is set to 0.8 to 1.0. At below the lower limit of this ratio, the thermal stability of the glass deteriorates and the liquidus temperature rises. The cation ratio of $((Ti^{4+}+W^{6+})/(Ti^{4+}+Nb^{5+}+Ta^{5+}+W^{6+}))$ is desirably 0.85 to 1.0, preferably 0.9 to 1.0, more preferably 0.95 to 1.0, and still more preferably, 1.0.

The optical glass of the present invention comprises a principal anion component in the form of $O^{2-}$, essentially making it an oxide glass. Small quantities of halogen components such as $F^-$ and $Cl^-$ can also be incorporated as anion components in addition to $O^{2-}$. However, when the focus is on moldability and suppressing the volatility of the glass melt, it is desirable to keep down the quantity of the volatile component $F^-$ that is incorporated; that is, it is desirable not to incorporate an $F^-$ component. It is possible to add trace quantities of halogens such as F and Cl, not as glass components, but as clarifying agents, when melting the glass.

Small quantities of $Sb_2O_3$, carbonates, sulfates, nitrates, and the like can be added as clarifying agents. However, when adding $Sb_2O_3$, Sb is a powerful oxidizer. Thus, to prevent facilitating an oxidation reduction reaction with the molding surface of the pressing mold, the quantity of $Sb_2O_3$ that is added based on the total amount of the glass components desirably falls within a range of 0 to 1 weight % and preferably falls within a range of 0 to 0.5 weight %.

Fe, Cr, Co, and Cu are desirably not added because they color the glass. Pb, Cd, Tl, As, and the like are desirably not added out of concern for a negative environmental impact. Small quantities of Lu and Ga can be added within a range that does not compromise the object of the present invention. These components are extremely expensive and the object of the present invention can be attained without their use. Thus, to keep costs down, Lu and Ga are desirably not incorporated into the glass.

In the above composition range, the combined content of $Si^{4+}$, $B^{3+}$, $Li^+$, $Na^+$, $K^+$, $Mg^{2+}$, $Ca^{2+}$, $Sr^{2+}$, $Ba^{2+}$, $Zn^{2+}$, $La^{3+}$, $Gd^{3+}$, $Y^{3+}$, $Yb^{3+}$, $Zr^{4'}$, $Ti^{4+}$, $Nb^{5+}$, $Ta^{5+}$, and $W^{6+}$ desirably constitutes 95% or higher, preferably 98% or higher, more preferably 99% or higher, still more preferably 99.5% or higher, and optimally, 100% to further enhance precision press moldability, lower the glass transition temperature, and obtain a glass with better thermal stability while maintaining the desired optical characteristics.

The combined content of $Si^{4+}$, $B^{3+}$, $Zn^{2+}$, $La^{3+}$, $Gd^{3+}$, $Zr^{4+}$, $Ti^{4+}$, and $W^{6+}$ desirably constitutes 95% or higher, preferably 98% or higher, more preferably 99% or higher, still more preferably 99.5% or higher, and optimally, 100%.

The optical glass below is one desirable form of the optical glass of the present invention.

The optical glass comprising, denoted as cation percentages:
3 to 7% of $Si^{4+}$,
29 to 38% of $B^{3+}$,
0% of $Li^+$,
0% of $Na^+$,
0% of $K^+$,
0% of $Mg^{2+}$,
0% of $Ca^{2+}$,
0% of $Sr^{2+}$,
0% of $Ba^{2+}$,
18 to 32% of $Zn^{2+}$,
14 to 18% of $La^{2+}$,
5 to 10% of $Gd^{3+}$,
0% of $Y^{3+}$,
0% of $Yb^{3+}$,
0 to 0.8% of $Zr^{4+}$,
4 to 9% of $Ti^{4+}$,
0% of $Nb^{5+}$,
0% of $Ta^{5+}$,
4 to 10% of $W^{6+}$,
0% of $Te^{4+}$,
0% of $Ge^{4+}$,
0% of $Bi^{3+}$, and
0% of $Al^{3+}$;
wherein the cation ratio of $(B^{3+}/(B^{3+}+Si^{4+}))$ is 0.80 to 0.93;
the cation ratio of $(B^{3+}/(La^{3+}+Gd^{3+}+Y^{3+}))$ is 1.20 to 1.51;
the cation ratio of $((B^{3+}+Si^{4+})/(La^{3+}+Gd^{3+}+Y^{3+}))$ is 1.4 to 1.7;
the cation ratio of $(B^{3+}/(Ti^{4+}+Nb^{5+}+Ta^{5+}+W^{6+}))$ is 2.20 to 2.62;
the cation ratio of $((B^{3+}+Si^{4+})/(Ti^{4+}+Nb^{5+}+Ta^{5+}+W^{6+}))$ is 2.3 to 3.0;
the cation ratio of $(Zn^{2+}/(Zn^{2+}+Mg^{2+}+Ca^{2+}+Sr^{2+}+Ba^{2+}))$ is 1.0;
the cation ratio of $((La^{3+}+Gd^{3+}+Y^{3+})/(Ti^{4+}+Nb^{5+}+Ta^{5+}+W^{6+}))$ is 1.6 to 2.1;
the cation ratio of $Ti^{4+}/W^{6+}$ is 0.1 to 1.9; and
the cation ratio of $((Ti^{4+}+W^{6+})/(Ti^{4+}+Nb^{5+}+Ta^{5+}+W^{6+}))$ is 1.0.

[The Refractive Index and Dispersion]

The refractive index nd of the optical glass of the present invention is 1.89 or higher and the Abbé number vd is 28 to 36. Having a refractive index nd of 1.89 or higher makes it possible to achieve more compact optical systems, such as image pickup optical systems and projection systems such as projectors using the optical glass of the present invention. The zoom ratio of optical systems can also be increased. Due to a high refractive index, it is possible to reduce the absolute value of the curvature of the optically functional surface of a lens to achieve a desired light-gathering power. Being able to reduce the absolute value of the curvature of the optically functional surface facilitates the processing of the molding surface of pressing molds employed in precision press molding. It is also possible to reduce the problem of reduced precision in transfer to the mold when atmospheric gas becomes trapped between the glass and the pressing mold during precision press molding (this is generally referred to as "gas trapping"). Processing is also facilitated when grinding and polishing the optical functional surface. It is also possible to increase the effective diameter of a lens by reducing the absolute value of the curvature of its optically functional surface.

Since the optical glass of the present invention has an Abbé number vd of 28 or higher while being a high-refractive-index glass, it is effectively combined with lenses made of high-refractive-index, high-dispersion glass as a lens material that is capable of good correction of chromatic aberration.

By having an Abbé number vd of 28 or higher, it is possible to limit the content of high-refractive-index, high-dispersion-imparting components such as $Ti^{4+}$, $Nb^{5+}$, and $W^{6+}$. Thus, it is also possible to indirectly enhance the precision press moldability of the glass.

Having an Abbé number vd exceeding 36 while maintaining a refractive index nd of 1.89 or higher lowers the thermal stability of the glass and raises the glass transition temperature. When the glass transition temperature rises, it becomes necessary to set the temperature high during precision press molding. This in turn promotes an oxidation reduction reaction between the glass and the pressing mold, tending to result in problems such as fusion of the glass to the pressing mold and fogging of the glass surface, thereby compromising precision press moldability.

For these reasons, the refractive index nd of the optical glass of the present invention is set to 1.89 or higher and the Abbé number vd is set to 28 to 36.

The desirable ranges of optical characteristics are as given below.

The upper limit of the nd is: desirably $nd \leq -0.01vd+2.256$ (formula (i)), preferably $nd \leq -0.01vd+2.252$ (formula (ii)), more preferably $nd \leq -0.01vd+2.248$ (formula (iii)), still more preferably, $nd \leq -0.01vd+2.244$ (formula (iv)), and even more preferably, $nd \leq 0.01vd+2.240$ (formula (v)).

The lower limit of the nd is:
desirably $nd \geq 1.890$ over the range of $vd \geq 31$, and $nd \geq -0.01vd+2.200$ over the range of $vd \leq 31$;
preferably $nd \geq 1.890$ over the range of $vd \geq 32$, and $nd \geq -0.01vd+2.210$ over the range of $vd \leq 32$;
more preferably $nd \geq 1.890$ over the range of $vd \geq 32.6$, and $nd \geq -0.01vd+2.216$ over the range of $vd \leq 32.6$;
still more preferably $nd \geq 1.900$ over the range of $vd \geq 31$, and $nd \geq -0.01vd+2.210$ over the range of $vd \leq 31$;
even more preferably $nd \geq 1.900$ over the range of $vd \geq 31.6$, and $nd \geq -0.01vd+2.216$ over the range of $vd \leq 31.6$;
and even still more preferably, $nd \geq 1.900$ over the range of $vd \geq 31$, and $nd \geq -0.01vd+2.220$ over the range of $vd \leq 31$.

The upper limit of vd is desirably $vd \leq 35.6$ (formula (xii)), preferably $vd \leq 35.0$ (formula (xiii)), more preferably $vd \leq 34.4$ (formula (xiv)), still more preferably $vd \leq 33.8$ (formula (xv)), and even more preferably, $vd \leq 33.4$ (formula (xvi)).

The lower limit of vd is desirably $vd \geq 29.0$ (formula (xvii)), preferably $vd \geq 30.0$ (formula (xviii)), more preferably $vd \geq 30.5$ (formula (xix)), still more preferably $vd \geq 31.0$ (formula (xx)), even more preferably $vd \geq 31.5$ (formula (xxi)), and even still more preferably, $vd \geq 32.0$ (formula (xxii)).

[The Glass Transition Temperature]

Keeping down the rise in the glass transition temperature that accompanies a high refractive index and low dispersion is extremely important to preventing a rise in the temperature during press molding and to not promoting a chemical reaction between the pressing mold and the glass. The preferred form of the optical glass of the present invention is an optical glass with a glass transition temperature of less than 630° C. A glass transition temperature of 630° C. or higher is undesirable for precision pressing, and at below the lower limit, the thermal stability of the glass deteriorates. From these perspectives, the upper limit of the glass transition temperature in the present invention is desirably 620° C. or lower, preferably 610° C. or lower. The lower limit of the glass transition temperature is desirably 550° C. or higher, preferably 560° C.

or higher, more preferably 570° C. or higher, still more preferably 580° C. or higher, and even more preferably, 590° C. or higher.

[The Liquidus Temperature]

In the optical glass of the present invention, it is possible to achieve a liquidus temperature of 1,200° C. or lower, for example, with good thermal stability. Thus, the glass starting materials can be melted at 1,300° C. or lower, and corrosion of the crucible in which melting is conducted can be inhibited. As a result, it is possible to avoid problems in the form of substances such as platinum that constitute the crucible contaminating the glass through corrosion and becoming foreign matter, or melting into the glass as ions and coloring the glass.

Keeping the liquidus temperature at or below 1,200° C. also lowers the temperature of the glass melt and inhibits volatization, and inhibits and reduces the generation of striae and variation in optical characteristics due to volatization. The ability to lower the temperature of the glass melt affords the advantage of making it possible to achieve a glass viscosity during flowing and molding that falls within a range that is suited to molding. In the present invention, the liquidus temperature is desirably 1,150 or lower, preferably 1,100° C. or lower, more preferably 1,050° C. or lower, still more preferably 1,040° C. or lower, and even more preferably, 1,030° C. or lower.

Such a low liquidus temperature is extremely advantageous for conducting a method of molding preforms for precision press molding by a process of causing the glass melt to flow out, separating glass melt gobs of desired weight from the glass that flows out, and solidifying the glass gobs. The method of molding the preforms will be described further below.

[The Partial Dispersion Characteristic]

It is effective to combine a low-dispersion glass lens and a high-dispersion glass lens to correct high-order chromatic aberration in image pickup optical systems and projection optical systems. Among low-dispersion glasses, those with low partial dispersion ratios are more effective at correcting high-order chromatic aberration. The optical glass of the present invention has a low partial dispersion ratio for a high-refractive-index, low-dispersion glass, with a Pg,F value of 0.57 to 0.62. The Pg,F is denoted using the various refractive indexes ng, nF, nc for g rays, F rays, and c rays:

$Pg,F=(ng-nF)/(nF-nc)$.

In a partial dispersion ratio Pg,F-Abbé number vd plot, when the partial dispersion ratio on the normal line serving as the reference of a normal partial dispersion glass is denoted as $Pg,F^{(0)}$, the Pg,F is given using the Abbé number vd as:

$Pg,F^{(0)}=0.6483-(0.0018\times vd)$ $\Delta Pg,F$, the difference in the partial dispersion ratio Pg,F from this normal line, is represented by the following equation:

$\Delta Pg,F=Pg,F-Pg,F^{(0)}=Pg,F+(0.0018\times vd)-0.6483$

In the preferred form of the optical glass of the present invention, the differential $\Delta Pg,F$ is 0.02 or lower, making it suitable as a material for an optical element for correcting high-order chromatic aberration. The range of $\Delta Pg,F$ in the present invention is desirably 0.01 or lower, preferably 0.008 or lower, more preferably 0.006 or lower, and still more preferably, 0.005 or lower.

[Coloration]

The optical glass of the present invention exhibits extremely little coloration and high optical transparency across a broad range in the visible region. The degree of coloration of an optical glass is denoted by the degrees of coloration $\lambda 70$, $\lambda 5$, etc. The degree of coloration $\lambda 70$ denotes the wavelength at which the external transmittance becomes 70% over a wavelength region of 280 to 700 nm, and $\lambda 5$ denotes the wavelength at which the external transmittance becomes 5% over this wavelength region. The external transmittance is obtained by directing a measurement beam into a piece of glass equipped with a pair of parallel optically ground flat surfaces that are separated (thickness) by 10 mm±0.1 mm from a direction perpendicular to the flat surfaces, and dividing the intensity Iout of the light passing through the glass by the intensity Iin of the entering light (which thus includes the loss due to reflection off the glass surface).

In the present invention, the range of $\lambda 70$ is desirably 470 nm or lower, preferably 450 nm or lower, more preferably 430 nm or lower, and still more preferably, 410 nm or lower. The range of $\lambda 5$ is desirably 370 nm or lower, preferably 365 nm or lower, more preferably 360 nm or lower, still more preferably 355 nm or lower, and even more preferably, 350 nm or lower.

[Manufacturing the Optical Glass]

The optical glass of the present invention can be obtained by weighing out, proportioning, and thoroughly mixing starting materials in the form of oxides, carbonates, sulfates, nitrates, hydroxides, and the like so as to obtain a mixed batch with a targeted glass composition; heating, melting, debubbling, and stirring the mixed batch in a melting vessel to prepare a homogenous glass melt containing no bubbles; and molding the glass melt. Specifically, it can be prepared using known melting methods.

[The Preform for Precision Press Molding]

The preform for precision press molding of the present invention will be described next.

The preform for precision press molding of the present invention is characterized by being comprised of the optical glass of the present invention set forth above. The preform for precision press molding (referred to as the "preform" hereinafter) means a piece of glass that is used in precision press molding in the form of a glass gob with a weight corresponding to that of a precision press molded article.

The preform will be described in detail below. The term "preform" means a premolded glass member that is heated and employed in precision press molding. The term "precision press molding," often and widely referred to as "mold optics molding," is a method of forming the optically functional surface of an optical element by transferring the molding surface of a pressing mold. The term "optically functional surface" means a surface that refracts, reflects, diffracts, admits, or emits light that is to be controlled in an optical element. The lens surface of a lens and the like correspond to optically functional surfaces.

The outer surface of the preform is desirably coated with a mold-releasing film so that the glass extends well along the molding surface while preventing a reaction between, and fusion of, the glass and the molding surface of the pressing mold during precision press molding. Examples of the mold-releasing film are noble metals (platinum, platinum alloy), oxides (oxides of Si, Al, Zr, La, Y or the like), nitrides (nitrides of B, Si, Al, and the like), and carbon-containing films.

Carbon-containing films that have carbon as their chief component (when the contents of the elements in the film are denoted as atomic percentages, the content of carbon is greater than the contents of the other elements) are desirable. Specific examples are carbon films and hydrogen carbide films. Known methods such as vacuum vapor deposition, sputtering, and ion plating employing a carbon starting material, and known methods such as thermal decomposition employing a material gas in the form of a hydrocarbon or the like can be employed as the method of forming the carbon-containing film. Other films can be formed by vapor deposition, sputtering, ion plating, the sol-gel process, or the like.

The preform is fabricated by the steps of heating and melting glass starting materials to prepare a glass melt, and molding the glass melt.

The first preform preparation example is a method of separating a glass melt gob of prescribed weight from a glass melt, cooling the glass melt gob, and molding it into a preform of identical weight. For example, glass starting materials are melted, clarified, and homogenized to prepare a homogenous glass melt. The glass melt is caused to flow through an outflow nozzle or an outflow pipe of regulated temperature made of platinum or a platinum alloy. When molding small preforms or spherical preforms, the glass melt is caused to drip down from the outflow nozzle in the form of glass melt droplets of prescribed weight. These droplets are received by preform-forming molds and molded into preforms. Alternately, glass melt droplets of prescribed weight are similarly caused to drip from an outflow nozzle into liquid nitrogen or the like to mold preforms. When fabricating medium or large preforms, a glass melt flow is caused to flow out of an outflow pipe, the tip of the glass melt flow is received on a preform-forming mold, a constriction is formed between the glass melt flow nozzle and the preform-forming mold, and the preform-forming mold is abruptly lowered downward. This separates the glass melt flow at the constriction by means of the surface tension of the glass melt. A glass melt gob of prescribed weight is then received in a receiving member and molded into a preform. Alternatively, a glass gob in a soften state is pressed on a perform forming mold to form a perform with a shape similar to that of an optical element to be prepared by a precision press molding. The surface of the preform thus obtained is smooth.

To manufacture a preform having a smooth surface free of scratches, grime, creases, and surface alterations, such as a preform having a free surface, it is possible to employ a method such as molding a preform while subjecting a glass melt gob to wind pressure on a preform-forming mold to float the gob, or molding a glass melt droplet into a preform by introducing it into a medium, such as liquid nitrogen, that is a gas at ordinary temperature and ordinary pressure but has been liquefied by refrigeration.

When molding a preform while floating a glass melt gob, a gas (called a "float gas") is blown onto the glass melt gob to generate upward wind pressure. In this process, if the viscosity of the glass melt gob is excessively low, the float gas penetrates the glass, remaining within the preform in the form of bubbles. By adjusting the viscosity of the glass melt gob to 3 to 60 dPa·s, it is possible to float the glass gob without causing the float gas to penetrate the glass.

Examples of gases that can be employed as float gases to blow the preform are air, $N_2$ gas, $O_2$ gas, Ar gas, He gas, and steam. The wind pressure is not specifically limited other than that it be capable of floating the preform in such a manner that it not come in contact with solid bodies such as the surface of the forming mold.

Many precision press molded articles (such as optical elements) that are manufactured from preforms have rotational axes of symmetry like those of lenses. It is thus desirable for the preform to have a shape with a rotational axis of symmetry.

In the first preform manufacturing example, there is a method called the "primary molding method." In the manufacturing of preforms, the primary molding method is a method of pressing with a pressing mold a piece of glass melt that has dripped down onto a preform pressing mold and is still soft to impart a shape approximating that of the optical element that is to be obtained by precision press molding. However, in this method, crystals tend to precipitate in the preform due to the softened glass being pressed in a pressing mold. Thus, the glass that is used to manufacture a preform by this method must have good thermal stability. Further, a shape approximating the shape of the targeted optical element is desirable in a preform that is comprised of a glass containing relatively large quantities of components that impart high refractive indexes, such as $Ti^{4+}$ ($TiO_2$) and $W^{6+}$ ($WO_3$), particularly a preform that is manufactured by the primary molding method. Conducting precision press molding with a preform that has been manufactured by the primary molding method makes it possible to lower the press molding temperature, shorten the pressing time, and lower the pressure employed in pressing, as well as permitting a reduction in problems such as reaction between the pressing mold and high-refractive-index-imparting components in the glass during precision press molding. The optical glass of the present invention has good thermal stability and is suited to the manufacturing of preforms with approximate shapes by the primary molding method.

In a second preform preparation example, a homogenous glass melt is cast into a casting mold and molded, strain of the molded member is eliminated by annealing, and the molded member is divided into prescribed dimensions and shape by cutting or slicing, yielding multiple pieces of glass. The pieces of glass are polished to smooth the surfaces thereof and produce preforms comprised of a prescribed weight of glass. The surfaces of the preforms prepared in this manner are also desirably coated with a carbon-containing film for use.

[The Optical Element]

The optical element of the present invention will be described next. The optical element of the present invention is characterized by comprising the optical glass of the present invention set forth above. Specific examples are: lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with diffraction gratings; prisms; and prisms with lens functions. As needed, an antireflective film, a partially reflective film with wavelength selectivity, or the like can be provided on the surface.

The optical element of the present invention is comprised of glass with a high refractive index and low dispersion and a low $\Delta Pg,F$. It can thus be combined with an optical element comprised of another glass to correct high-order chromatic aberration. Since the optical element of the present invention is comprised of glass with a high refractive index, it can be used in image pickup optical systems, projection optical systems, and the like to render such optical systems compact.

[The Method for Manufacturing an Optical Element]

The method for manufacturing an optical element of the present invention will be described next.

The method for manufacturing an optical element of the present invention is characterized by comprising the steps of heating the preform for precision press molding of the present invention set forth above and employing a pressing mold to conduct precision press molding.

To prevent oxidation of the molding surface of the pressing mold and mold-releasing film provided on the molding surface of the pressing mold, the steps of heating the pressing mold and preform and conducting pressing are desirably conducted in a non-oxidizing atmosphere such as nitrogen or a mixture of nitrogen gas and hydrogen gas. In a non-oxidizing gas atmosphere, the film remains on the surface of the precision press molded article without oxidizing the carbon-containing film covering the preform surface. This film must ultimately be removed. To relatively easily and completely remove the carbon-containing film, it suffices to heat the precision press molded article in an oxidizing atmosphere such as air. The oxidation and removal of the carbon-containing film must be conducted at a temperature at which the precision press molded article is not deformed by heat. Specifically, these are desirably conducted within a temperature range lying below the glass transition temperature.

A pressing mold the molding surface of which has been preprocessed with great precision to a desired shape is employed in precision press molding. It suffices to form a mold-releasing film on the molding surface to prevent fusion with the glass during pressing. Examples of mold-releasing films are carbon-containing films, nitride films, and noble metal films. Hydrogenated carbon films, carbon films, and the like are desirable as carbon-containing films. In precision press molding, a preform is fed between an opposing pair of molds comprised of an upper mold and a lower mold the molding surfaces of which have been processed to precise shapes, both the forming molds and preform are heated to a temperature corresponding to a glass viscosity of $10^5$ to $10^9$ dPa·s to soften the preform, and the preform is pressure molded to precisely transfer the molding surfaces of the forming molds to the glass.

It is also possible to feed a preform that has been preheated to a temperature corresponding to a glass viscosity of $10^4$ to $10^8$ dPa·s between an opposing pair of molds comprised of an upper mold and a lower mold the molding surfaces of which have been processed to precise shapes, and pressure mold the preform to precisely transfer the molding surfaces of the forming molds to the glass.

The pressure and duration of pressing can be suitably determined taking into account the viscosity of the glass and the like. For example, a pressing pressure of about 5 to 15 MPa and a pressing duration of 10 to 300 seconds can be employed. Pressing conditions such as the pressing duration and pressing pressure can be suitably set within known ranges in accordance with the shape and dimensions of the article being molded.

Subsequently, the pressing mold and the precision press molded article are cooled, the mold is opened at a temperature that is desirably lower than the strain point, and the precision press molded article is removed from the mold. It suffices to suitably adjust the annealing conditions, such as the annealing rate, of the molded article during cooling to bring optical characteristics precisely in line with targeted values.

The above methods for manufacturing an optical element can be roughly divided into the following two methods. The first method is a method for manufacturing an optical element in which the preform is introduced into a pressing mold and the pressing mold and glass material are heated together. The second method is a method for manufacturing an optical element in which the preform is heated and then introduced into a preheated pressing mold, where it is precision press molded. This method is recommended when the focus is on enhancing productivity.

The optical element of the present invention can be fabricated without a press molding step. For example, a homogenous glass melt is cast into a casting mold to mold a glass block. The glass block is annealed to remove strain while subjecting it to optical characteristic adjustment by adjusting the annealing conditions to achieve a glass refractive index of desired value. Next, the glass block is cut or sliced into pieces of glass which are then ground and polished to obtain finished optical elements.

EMBODIMENTS

The present invention will be specifically described below through embodiments. However, the present invention is not limited to the embodiments.

Embodiment 1

Oxides, carbonates, sulfates, nitrates, hydroxides, and the like were employed as starting materials for introducing various components. These were weighed out to yield the glass compositions given in Table 1 and thoroughly mixed to obtain blended starting materials. The blended starting materials were charged to platinum crucibles, heated, and melted. Following melting, the glass melts were caused to flow into casting molds, cooled to close to the glass transition temperature, and then immediately placed in annealing furnaces. Annealing was conducted for about an hour within the glass transition temperature range, after which the glasses were cooled within the furnaces to room temperature, yielding optical glasses Nos. 1 to 15 (oxide optical glasses) shown in Table 1.

No crystals that were observable by microscope precipitated in the optical glasses obtained. The various characteristics of the optical glasses thus obtained are given in Table 1. Table 2 gives the weight percentages of the compositions as converted to oxides of the various glasses of Optical Glass Nos. 1 to 15.

TABLE 1

| | No. | | | | | | | |
|---|---|---|---|---|---|---|---|---|
| | 1 | 2 | 3 | 4 | 5 | 6 | 7 | 8 |
| $Si^{4+}$(cat. %) | 6.00 | 5.83 | 5.22 | 4.36 | 3.00 | 4.41 | 5.41 | 6.41 |
| $B^{3+}$(cat. %) | 33.50 | 32.51 | 29.13 | 30.91 | 35.50 | 37.19 | 36.19 | 33.19 |
| $Li^+$(cat. %) | 0.00 | 0.00 | 0.00 | 0.00 | 0.00 | 0.00 | 0.00 | 0.00 |
| $Na^+$(cat. %) | 0.00 | 0.00 | 0.00 | 0.00 | 0.00 | 0.00 | 0.00 | 0.00 |
| $K^+$(cat. %) | 0.00 | 0.00 | 0.00 | 0.00 | 0.00 | 0.00 | 0.00 | 0.00 |
| $Mg^{2+}$(cat. %) | 0.00 | 0.00 | 0.00 | 0.00 | 0.00 | 0.00 | 0.00 | 0.00 |
| $Ca^{2+}$(cat. %) | 0.00 | 0.00 | 0.00 | 0.00 | 0.00 | 0.00 | 0.00 | 0.00 |
| $Sr^{2+}$(cat. %) | 0.00 | 0.00 | 0.00 | 0.00 | 0.00 | 0.00 | 0.00 | 0.00 |
| $Ba^{2+}$(cat. %) | 0.00 | 0.00 | 0.00 | 0.00 | 0.00 | 0.00 | 0.00 | 0.00 |
| $Zn^{2+}$(cat. %) | 22.00 | 24.27 | 32.17 | 30.35 | 22.00 | 19.66 | 19.66 | 21.66 |
| $La^{3+}$(cat. %) | 17.00 | 16.50 | 14.78 | 15.18 | 17.00 | 17.56 | 17.56 | 17.56 |
| $Gd^{3+}$(cat. %) | 7.00 | 6.80 | 6.09 | 6.25 | 7.00 | 7.00 | 7.00 | 7.00 |
| $Y^{3+}$(cat. %) | 0.00 | 0.00 | 0.00 | 0.00 | 0.00 | 0.00 | 0.00 | 0.00 |
| $Yb^{3+}$(cat. %) | 0.00 | 0.00 | 0.00 | 0.00 | 0.00 | 0.00 | 0.00 | 0.00 |

TABLE 1-continued

|  | | | | | | | | |
|---|---|---|---|---|---|---|---|---|
| $Zr^{4+}$(cat. %) | 0.50 | 0.49 | 0.43 | 0.45 | 0.50 | 0.54 | 0.54 | 0.54 |
| $Ti^{4+}$(cat. %) | 6.00 | 5.83 | 5.22 | 5.36 | 6.00 | 10.73 | 10.73 | 8.73 |
| $Nb^{5+}$(cat. %) | 0.00 | 0.00 | 0.00 | 0.00 | 0.00 | 0.00 | 0.00 | 0.00 |
| $Ta^{5+}$(cat. %) | 0.00 | 0.00 | 0.00 | 0.00 | 0.00 | 0.00 | 0.00 | 0.00 |
| $W^{6+}$(cat. %) | 8.00 | 7.77 | 6.96 | 7.14 | 9.00 | 2.91 | 2.91 | 4.91 |
| $Te^{4+}$(cat. %) | 0.00 | 0.00 | 0.00 | 0.00 | 0.00 | 0.00 | 0.00 | 0.00 |
| $Ge^{4+}$(cat. %) | 0.00 | 0.00 | 0.00 | 0.00 | 0.00 | 0.00 | 0.00 | 0.00 |
| $Bi^{3+}$(cat. %) | 0.00 | 0.00 | 0.00 | 0.00 | 0.00 | 0.00 | 0.00 | 0.00 |
| $Al^{3+}$(cat. %) | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $B^{3+}/(Si^{4+} + B^{3+})$ | 0.85 | 0.85 | 0.85 | 0.88 | 0.92 | 0.89 | 0.87 | 0.84 |
| $B^{3+}/(La^{3+} + Gd^{3+} + Y^{3+})$ | 1.40 | 1.40 | 1.40 | 1.44 | 1.48 | 1.51 | 1.47 | 1.35 |
| $(Si^{4+} + B^{3+})/(La^{3+} + Gd^{3+} + Y^{3+})$ | 1.65 | 1.65 | 1.65 | 1.65 | 1.60 | 1.69 | 1.69 | 1.61 |
| $B^{3+}/(Ti^{4+} + Nb^{5+} + Ta^{5+} + W^{6+})$ | 2.39 | 2.39 | 2.39 | 2.47 | 2.37 | 2.73 | 2.65 | 2.43 |
| $(Si4+ + B3+)/(Ti^{4+} + Nb^{5+} + Ta^{5+} + W^{6+})$ | 2.82 | 2.82 | 2.82 | 2.82 | 2.57 | 3.05 | 3.05 | 2.90 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 1.71 | 1.71 | 1.71 | 1.71 | 1.60 | 1.80 | 1.80 | 1.80 |
| $Ti^{4+}/W^{6+}$ | 0.75 | 0.75 | 0.75 | 0.75 | 0.67 | 3.69 | 3.69 | 1.78 |
| $(Ti^{4+} + W^{6+})/(Ti^{4+} + Nb^{5+} + Ta^{5+} + W^{6+})$ | 1.00 | 1.00 | 1.00 | 1.00 | 1.00 | 1.00 | 1.00 | 1.00 |
| nd | 1.89459 | 1.89636 | 1.89916 | 1.90025 | 1.90824 | 1.90217 | 1.90060 | 1.90100 |
| ν d | 32.93 | 32.83 | 32.45 | 32.48 | 32.14 | 32.53 | 32.64 | 32.70 |
| $P_{g,F}$ | 0.5904 | 0.5923 | 0.5933 | 0.5927 | 0.5931 | 0.5914 | 0.5926 | 0.5913 |
| $\Delta P_{g,F}$ | 0.0014 | 0.0031 | 0.0034 | 0.0029 | 0.0027 | 0.0017 | 0.0031 | 0.0019 |
| Specific gravity | 5.29 | 5.31 | 5.35 | 5.35 | 5.39 | 5.04 | 5.03 | 5.17 |
| Tg(° C.) | 599 | 594 | 585 | 582 | 593 | 604 | 608 | 604 |
| Ts(° C.) | 641 | 636 | 625 | 624 | 632 | 648 | 650 | 647 |
| Liquidus temperature (° C.) | 990 or less | 990 or less | 1050 or less | 1030 or less | 980 or less | 1070 or less | 1060 or less | 1010 or less |
| λ 70(nm) | 411 | 410 | 412 | 411 | 413 | 421 | 423 | 422 |
| λ 5(nm) | 359 | 359 | 359 | 359 | 360 | 360 | 361 | 361 |

| | | No. | | | | | | |
|---|---|---|---|---|---|---|---|---|
| | | 9 | 10 | 11 | 12 | 13 | 14 | 15 |
| | $Si^{4+}$(cat. %) | 6.41 | 6.41 | 6.41 | 6.41 | 6.41 | 4.50 | 4.00 |
| | $B^{3+}$(cat. %) | 33.19 | 31.19 | 32.94 | 32.69 | 30.19 | 33.50 | 34.25 |
| | $Li^+$(cat. %) | 0.00 | 0.00 | 0.00 | 0.00 | 0.00 | 0.00 | 0.00 |
| | $Na^+$(cat. %) | 0.00 | 0.00 | 0.00 | 0.00 | 0.00 | 0.00 | 0.00 |
| | $K^+$(cat. %) | 0.00 | 0.00 | 0.00 | 0.00 | 0.00 | 0.00 | 0.00 |
| | $Mg^{2+}$(cat. %) | 0.00 | 0.00 | 0.00 | 0.00 | 0.00 | 0.00 | 0.00 |
| | $Ca^{2+}$(cat. %) | 0.00 | 0.00 | 0.00 | 0.00 | 0.00 | 0.00 | 0.00 |
| | $Sr^{2+}$(cat. %) | 0.00 | 0.00 | 0.00 | 0.00 | 0.00 | 0.00 | 0.00 |
| | $Ba^{2+}$(cat. %) | 0.00 | 0.00 | 0.00 | 0.00 | 0.00 | 0.00 | 0.00 |
| | $Zn^{2+}$(cat. %) | 21.66 | 23.66 | 21.91 | 22.16 | 26.16 | 23.00 | 22.75 |
| | $La^{3+}$(cat. %) | 17.56 | 17.56 | 17.81 | 17.81 | 17.56 | 17.50 | 17.50 |
| | $Gd^{3+}$(cat. %) | 7.54 | 7.00 | 7.00 | 7.25 | 7.00 | 7.50 | 7.50 |
| | $Y^{3+}$(cat. %) | 0.00 | 0.00 | 0.00 | 0.00 | 0.00 | 0.00 | 0.00 |
| | $Yb^{3+}$(cat. %) | 0.00 | 0.00 | 0.00 | 0.00 | 0.00 | 0.00 | 0.00 |
| | $Zr^{4+}$(cat. %) | 0.00 | 0.54 | 0.54 | 0.54 | 0.54 | 0.50 | 0.50 |
| | $Ti^{4+}$(cat. %) | 8.73 | 6.73 | 8.48 | 8.23 | 7.23 | 4.50 | 4.50 |
| | $Nb^{5+}$(cat. %) | 0.00 | 0.00 | 0.00 | 0.00 | 0.00 | 0.00 | 0.00 |
| | $Ta^{5+}$(cat. %) | 0.00 | 0.00 | 0.00 | 0.00 | 0.00 | 0.00 | 0.00 |
| | $W^{6+}$(cat. %) | 4.91 | 6.91 | 4.91 | 4.91 | 4.91 | 9.00 | 9.00 |
| | $Te^{4+}$(cat. %) | 0.00 | 0.00 | 0.00 | 0.00 | 0.00 | 0.00 | 0.00 |
| | $Ge^{4+}$(cat. %) | 0.00 | 0.00 | 0.00 | 0.00 | 0.00 | 0.00 | 0.00 |
| | $Bi^{3+}$(cat. %) | 0.00 | 0.00 | 0.00 | 0.00 | 0.00 | 0.00 | 0.00 |
| | $Al^{3+}$(cat. %) | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| | $B^{3+}/(Si^{4+} + B^{3+})$ | 0.84 | 0.83 | 0.84 | 0.84 | 0.82 | 0.88 | 0.90 |
| | $B^{3+}/(La^{3+} + Gd^{3+} + Y^{3+})$ | 1.32 | 1.27 | 1.33 | 1.30 | 1.23 | 1.34 | 1.37 |
| | $(Si^{4+} + B^{3+})/(La^{3+} + Gd^{3+} + Y^{3+})$ | 1.58 | 1.53 | 1.59 | 1.56 | 1.49 | 1.52 | 1.53 |
| | $B^{3+}/(Ti^{4+} + Nb^{5+} + Ta^{5+} + W^{6+})$ | 2.43 | 2.29 | 2.46 | 2.49 | 2.49 | 2.48 | 2.54 |
| | $(Si4+ + B3+)/(Ti^{4+} + Nb^{5+} + Ta^{5+} + W^{6+})$ | 2.90 | 2.76 | 2.94 | 2.98 | 3.01 | 2.81 | 2.83 |
| | $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 | 1.00 |
| | $(La^{3+} + Gd^{3+} + Y^{3+})/(Ti^{4+} + Nb^{5+} + Ta^{5+} + W^{6+})$ | 1.84 | 1.80 | 1.85 | 1.91 | 2.02 | 1.85 | 1.85 |
| | $Ti^{4+}/W^{6+}$ | 1.78 | 0.97 | 1.73 | 1.68 | 1.47 | 0.50 | 0.50 |

TABLE 1-continued

|  |  |  |  |  |  |  |  |
|---|---|---|---|---|---|---|---|
| $(Ti^{4+} + W^{6+})/(Ti^{4+} + Nb^{5+} + Ta^{5+} + W^{6+})$ | 1.00 | 1.00 | 1.00 | 1.00 | 1.00 | 1.00 | 1.00 |
| nd | 1.90004 | 1.90411 | 1.90139 | 1.90097 | 1.90233 | 1.90128 | 1.90134 |
| νd | 32.81 | 32.65 | 32.89 | 33.01 | 33.03 | 33.07 | 33.11 |
| $P_{g,F}$ | 0.5928 | 0.5919 | 0.5958 | 0.5936 | 0.5941 | 0.5916 | 0.5933 |
| $\Delta P_{g,F}$ | 0.0036 | 0.0024 | 0.0067 | 0.0047 | 0.0053 | 0.0028 | 0.0046 |
| Specific gravity | 5.19 | 5.32 | 5.19 | 5.21 | 5.28 | 5.44 | 5.44 |
| Tg(°C.) | 605 | 601 | 607 | 607 | 602 | 597 | 595 |
| Ts(°C.) | 649 | 643 | 648 | 649 | 641 | 637 | 636 |
| Liquidus temperature (°C.) | 1050 or less | 1020 or less | 1020 or less | 1050 or less | 1050 or less | 1010 or less | 1030 or less |
| λ70(nm) | 421 | 421 | 420 | 419 | 421 | 414 | 413 |
| λ5(nm) | 360 | 360 | 360 | 359 | 359 | 359 | 359 |

TABLE 2

| No. | 1 | 2 | 3 | 4 | 5 | 6 | 7 | 8 |
|---|---|---|---|---|---|---|---|---|
| $SiO_2$(wt. %) | 3.70 | 3.61 | 3.29 | 2.74 | 1.83 | 2.98 | 3.65 | 4.13 |
| $B_2O_3$(wt. %) | 11.96 | 11.67 | 10.62 | 11.26 | 12.52 | 14.57 | 14.13 | 12.37 |
| $Li_2O$(wt. %) | 0.00 | 0.00 | 0.00 | 0.00 | 0.00 | 0.00 | 0.00 | 0.00 |
| $Na_2O$(wt. %) | 0.00 | 0.00 | 0.00 | 0.00 | 0.00 | 0.00 | 0.00 | 0.00 |
| $K_2O$(wt. %) | 0.00 | 0.00 | 0.00 | 0.00 | 0.00 | 0.00 | 0.00 | 0.00 |
| MgO(wt. %) | 0.00 | 0.00 | 0.00 | 0.00 | 0.00 | 0.00 | 0.00 | 0.00 |
| CaO(wt. %) | 0.00 | 0.00 | 0.00 | 0.00 | 0.00 | 0.00 | 0.00 | 0.00 |
| SrO(wt. %) | 0.00 | 0.00 | 0.00 | 0.00 | 0.00 | 0.00 | 0.00 | 0.00 |
| BaO(wt. %) | 0.00 | 0.00 | 0.00 | 0.00 | 0.00 | 0.00 | 0.00 | 0.00 |
| ZnO(wt. %) | 18.36 | 20.34 | 27.45 | 25.86 | 18.14 | 18.00 | 17.95 | 18.88 |
| $La_2O_3$(wt. %) | 28.40 | 27.71 | 25.24 | 25.89 | 28.05 | 32.19 | 32.10 | 30.65 |
| $Gd_2O_3$(wt. %) | 13.01 | 12.69 | 11.56 | 11.86 | 12.85 | 14.28 | 14.24 | 13.59 |
| $Y_2O_3$(wt. %) | 0.00 | 0.00 | 0.00 | 0.00 | 0.00 | 0.00 | 0.00 | 0.00 |
| $Yb_2O_3$(wt. %) | 0.00 | 0.00 | 0.00 | 0.00 | 0.00 | 0.00 | 0.00 | 0.00 |
| $ZrO_2$(wt. %) | 0.63 | 0.62 | 0.56 | 0.58 | 0.62 | 0.75 | 0.75 | 0.72 |
| $TiO_2$(wt. %) | 4.92 | 4.80 | 4.37 | 4.48 | 4.85 | 9.65 | 9.62 | 7.47 |
| $Nb_2O_5$(wt. %) | 0.00 | 0.00 | 0.00 | 0.00 | 0.00 | 0.00 | 0.00 | 0.00 |
| $Ta_2O_5$(wt. %) | 0.00 | 0.00 | 0.00 | 0.00 | 0.00 | 0.00 | 0.00 | 0.00 |
| $WO_3$(wt. %) | 19.02 | 18.56 | 16.91 | 17.33 | 21.14 | 7.58 | 7.56 | 12.19 |
| $TeO_2$(wt. %) | 0.00 | 0.00 | 0.00 | 0.00 | 0.00 | 0.00 | 0.00 | 0.00 |
| $GeO_2$(wt. %) | 0.00 | 0.00 | 0.00 | 0.00 | 0.00 | 0.00 | 0.00 | 0.00 |
| $Bi_2O_3$(wt. %) | 0.00 | 0.00 | 0.00 | 0.00 | 0.00 | 0.00 | 0.00 | 0.00 |
| $Al_2O_3$(wt. %) | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |

| No. | 9 | 10 | 11 | 12 | 13 | 14 | 15 |
|---|---|---|---|---|---|---|---|
| $SiO_2$(wt. %) | 4.11 | 3.96 | 4.11 | 4.10 | 4.07 | 2.70 | 2.40 |
| $B_2O_3$(wt. %) | 12.33 | 11.15 | 12.25 | 12.09 | 11.08 | 11.63 | 11.93 |
| $Li_2O$(wt. %) | 0.00 | 0.00 | 0.00 | 0.00 | 0.00 | 0.00 | 0.00 |
| $Na_2O$(wt. %) | 0.00 | 0.00 | 0.00 | 0.00 | 0.00 | 0.00 | 0.00 |
| $K_2O$(wt. %) | 0.00 | 0.00 | 0.00 | 0.00 | 0.00 | 0.00 | 0.00 |
| MgO(wt. %) | 0.00 | 0.00 | 0.00 | 0.00 | 0.00 | 0.00 | 0.00 |
| CaO(wt. %) | 0.00 | 0.00 | 0.00 | 0.00 | 0.00 | 0.00 | 0.00 |
| SrO(wt. %) | 0.00 | 0.00 | 0.00 | 0.00 | 0.00 | 0.00 | 0.00 |
| BaO(wt. %) | 0.00 | 0.00 | 0.00 | 0.00 | 0.00 | 0.00 | 0.00 |
| ZnO(wt. %) | 18.82 | 19.79 | 19.04 | 19.18 | 22.47 | 18.67 | 18.51 |
| $La_2O_3$(wt. %) | 30.55 | 29.40 | 30.98 | 30.86 | 30.19 | 28.43 | 28.50 |
| $Gd_2O_3$(wt. %) | 14.60 | 13.04 | 13.54 | 13.97 | 13.39 | 13.56 | 13.59 |
| $Y_2O_3$(wt. %) | 0.00 | 0.00 | 0.00 | 0.00 | 0.00 | 0.00 | 0.00 |
| $Yb_2O_3$(wt. %) | 0.00 | 0.00 | 0.00 | 0.00 | 0.00 | 0.00 | 0.00 |
| $ZrO_2$(wt. %) | 0.00 | 0.69 | 0.71 | 0.71 | 0.71 | 0.61 | 0.62 |
| $TiO_2$(wt. %) | 7.45 | 5.52 | 7.23 | 6.99 | 6.09 | 3.59 | 3.59 |
| $Nb_2O_5$(wt. %) | 0.00 | 0.00 | 0.00 | 0.00 | 0.00 | 0.00 | 0.00 |
| $Ta_2O_5$(wt. %) | 0.00 | 0.00 | 0.00 | 0.00 | 0.00 | 0.00 | 0.00 |
| $WO_3$(wt. %) | 12.14 | 16.45 | 12.14 | 12.10 | 12.00 | 20.81 | 20.86 |
| $TeO_2$(wt. %) | 0.00 | 0.00 | 0.00 | 0.00 | 0.00 | 0.00 | 0.00 |
| $GeO_2$(wt. %) | 0.00 | 0.00 | 0.00 | 0.00 | 0.00 | 0.00 | 0.00 |
| $Bi_2O_3$(wt. %) | 0.00 | 0.00 | 0.00 | 0.00 | 0.00 | 0.00 | 0.00 |
| $Al_2O_3$(wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

The various characteristics of the optical glasses were measured by the following methods.

(1) Refractive Indexes nd, ng, nF, nc and the Abbé Number vd

Refractive indexes nd, ng, nF, and nc, and the Abbé number vd were measured by the refractive index measuring methods of the Japan Optical Glass Industry Society standards for glasses obtained by lowering the temperature at a rate of −30° C./hour.

(2) Liquidus Temperature LT

The liquidus temperature was determined by placing the glass in a furnace that had been heated to a prescribed temperature, maintaining the glass in the furnace for two hours, cooling the glass, and observing the interior of the glass for crystals by optical microscopy at 100-fold magnification.

(3) The Glass Transition Temperature Tg and Yield Point Ts

These were measured at a rate of temperature increase of 4° C./minute with a thermomechanical analyzer made by Rigaku Corp.

(4) The Partial Dispersion Ratio Pg,F

This was calculated from the refractive indexes ng, nF, and nc.

(5) Deviation ΔPg,F of the Partial Dispersion Ratio from the Normal Line.

This was calculated from the partial dispersion ratio Pg,F$^{(0)}$ on the normal line as calculated from the partial dispersion ratio Pg,F and the Abbé number vd.

(6) Specific Gravity

The specific gravity was calculated by Archimedes' method.

(7) λ70, λ5

Both were calculated from the spectral transmittance measured by a spectrometer.

Embodiment 2

Glass starting materials that had been blended to obtain the various optical glasses prepared in Embodiment 1 were melted, clarified, and homogenized to prepare glass melts. Droplets of the glass melts were made to drip from platinum nozzles and received in preform forming molds. Spherical preforms comprised of the various above glasses were then molded while being floated by means of wind pressure.

Each of the above glass melts was continuously made to flow out of a platinum pipe, the lower tip of the glass melt flow was received in a preform forming mold, a constriction was formed in the glass melt flow, and the preform forming mold was abruptly lowered directly downward to sever the glass melt flow at the constriction. The glass melt gob thus separated was received on the preform forming mold and preforms comprised of the various above glasses were molded while being floated by means of wind pressure.

The preforms obtained were optically homogenous and of high quality.

A glass melt on a preform forming mold can be pressed to form a preform with a shape similar to that of an optical element to be prepared by a precision press molding. The surface of the preform thus obtained was smooth.

Embodiment 3

Each of the glass melts prepared in Embodiment 2 was continuously made to flow into a casting mold, molded into a glass block, annealed, and cut to obtain multiple pieces of glass. The pieces of glass were ground and polished to prepare preforms comprised of the various glasses.

The preforms obtained were optically homogenous and of high quality.

Embodiment 4

The surface of each of the preforms obtained in Embodiments 2 and 3 was coated with a carbon-containing film. Each preform was introduced into a pressing mold comprised of upper and lower SiC molds equipped with carbon-based mold-releasing films on the molding surfaces thereof and a sleeve mold. The forming mold and the preform were both heated in a nitrogen atmosphere to soften the preform. The preform was precision press molded to prepare various lenses such as aspherical convex meniscus lenses, aspherical concave meniscus lenses, aspherical biconvex lenses, and aspherical biconcave lenses comprised of the various above glasses. The various precision press molding conditions were adjusted to within the ranges set forth above.

Observation of the various lenses thus fabricated revealed no opacity or the like due to phase separation, scratching of the lens surface, fogging, or damage in any form.

The above process was repeated and large quantity production testing of each lens was conducted. No problems such as fusion of the glass and the pressing mold were observed, and it was possible to produce lenses having both high-quality surfaces and interiors with high precision. Antireflective films could also be coated on the surfaces of lenses thus obtained.

Next, the above preforms that had been coated with carbon-containing films were heated and softened, introduced into pressing molds that had been separately preheated, and precision press molded to prepare various lenses such as aspherical convex meniscus lenses, aspherical concave meniscus lenses, aspherical biconvex lenses, and aspherical biconcave lenses comprised of the various above glasses. The various precision press molding conditions were adjusted to within the ranges set forth above.

Observation of the various lenses thus fabricated revealed no opacity or the like due to phase separation, scratching of the lens surface, fogging, or damage in any form.

The above process was repeated and large quantity production testing of each lens was conducted. No problems such as fusion of the glass and the pressing mold were observed, and it was possible to produce lenses having both high-quality surfaces and interiors with high precision. Antireflective films could also be coated on the surfaces of lenses thus obtained.

The various optical elements such as prisms, microlenses and lens arrays can be fabricated by suitably altering the shape of the molding surfaces of the pressing mold.

Embodiment 5

The various lenses fabricated in Embodiment 4 were used to fabricate various replacement lenses for single-lens reflex cameras with various built-in lenses.

The various lenses fabricated in Embodiment 4 were also used to fabricate the optical systems of various compact digital cameras and modularized. Modularization was also conducted by mounting image sensors such as CCDs and CMOSs into these optical systems.

Using the various lenses fabricated in Embodiment 4 in this manner made it possible to obtain high functional, compact optical systems, replacement lenses, lens modules, and image pickup devices. Combining the lenses fabricated in Embodiment 4 with lenses made of high-refractive-index, low-dispersion optical glass made it possible to obtain various optical systems performing high-order chromatic aberration correction and image pickup devices equipped with these optical systems.

INDUSTRIAL APPLICABILITY

The optical glass of the present invention has the characteristics of a high refractive index and low dispersion, has good precision press molding properties and a low glass transition temperature, and is suited to precision press molding. It is suited to the correction of high-order chromatic aberration as well as to use in manufacturing optical elements and preforms for precision press molding.

What is claimed is:

1. An optical glass, comprising, denoted as cation percentages:
   1 to 10% of $Si^{4+}$,
   25 to 40% of $B^{3+}$,
   0 to 10% of $Li^+$,
   0 to 5% of $Na^+$,
   0 to 5% of $K^+$,
   0 to 5% of $Mg^{2+}$,
   0 to 5% of $Ca^{2+}$,
   0 to 5% of $Sr^{2+}$,
   0 to 5% of $Ba^{2+}$,
   10 to 40% of $Zn^{2+}$,
   10 to 25% of $La^{3+}$,
   1 to 15% of $Gd^{3+}$,
   0 to 5% of $Y^{3+}$,
   0 to 5% of $Yb^{3+}$,
   0 to 3% of $Zr^{4+}$,
   1 to 15% of $Ti^{4+}$,
   0 to 5% of $Nb^{5+}$,
   0 to 5% of $Ta^{5+}$,
   1 to 20% of $W^{6+}$,
   0 to 5% of $Te^{4+}$,
   0 to 5% of $Ge^{4+}$,
   0 to 5% of $Bi^{3+}$, and
   0 to 5% of $Al^{3+}$;
   wherein the cation ratio of $(B^{3+}/(B^{3+}+Si^{4+}))$ is 0.70 to 0.96;
   the cation ratio of $(B^{3+}/(La^{3+}+Gd^{3+}+Y^{3+}))$ is 1.0 to 2.0;
   the cation ratio of $((B^{3+}+Si^{4+})/(La^{3+}+Gd^{3+}+Y^{3+})$ is 1.0 to 3.0;
   the cation ratio of $(B^{3+}/(Ti^{4+}+Nb^{5+}Ta^{5+}+W^{6+}))$ is 0.8 to 4.0;
   the cation ratio of $((B^{3+}+Si^{4+})/(Ti^{4+}+Nb^{5+}Ta^{5+}+W^{6+}))$ is 1.5 to 5.0;
   the cation ratio of $(Zn^{2+}/(Zn^{2+}+Mg^{2+}+Ca^{2+}+Sr^{2+}+Ba^{2+}))$ is 0.8 to 1.0;
   the cation ratio of $((La^{3+}+Gd^{3+}+Y^{3+})/(Ti^{4+}+Nb^{5+}Ta^{5+}+W^{6+}))$ is 1.4 to 3.0;
   the cation ratio of $Ti^{4+}/W^{6+}$ is 0.1 to 4.0;
   the cation ratio of $((Ti^{4+}+W^{6+})/(Ti^{4+}+Nb^{5+}Ta^{5+}+W^{6+}))$ is 0.8 to 1.0;
   having an Abbé number vd of 28 to 34.4 and a refractive index nd of nd≥1.900 over a range of vd≥31.6 and nd≥−0.01 vd+2.216 over a range of vd≤31.6.

2. The optical glass according to claim 1, wherein the content of $Nb^{5+}$ and $Ta^{5+}$ is 0 cation %.

3. The optical glass according to claim 2, wherein the cation ratio of $(B^{3+}/(La^{3+}+Gd^{3+}+Y^{3+}))$ is 1.2 to 1.51.

4. The optical glass according to claim 1, comprising, denoted as cation percentages:
   3 to 7% of $Si^{4+}$,
   29 to 38% of $B^{3+}$,
   0% of $Li^+$,
   0% of $Na^+$,
   0% of $K^+$,
   0% of $Mg^{2+}$,
   0% of $Ca^{2+}$,
   0% of $Sr^{2+}$,
   0% of $Ba^{2+}$,
   18 to 32% of $Zn^{2+}$,
   14 to 18% of $La^{2+}$,
   5 to 10% of $Gd^{3+}$,
   0% of $Y^{3+}$,
   0% of $Yb^{3+}$,
   0 to 0.8% of $Zr^{4+}$,
   4 to 9% of $Ti^{4+}$,
   0% of $Nb^{5+}$,
   0% of $Ta^{5+}$,
   4 to 10% of $W^{6+}$,
   0% of $Te^{4+}$,
   0% of $Ge^{4+}$,
   0% of $Bi^{3+}$, and
   0% of $Al^{3+}$;
   wherein the cation ratio of $(B^{3+}/(B^{3+}+Si^{4+}))$ is 0.80 to 0.93;
   the cation ratio of $(B^{3+}/(La^{3+}+Gd^{3+}+Y^{3+}))$ is 1.20 to 1.51;
   the cation ratio of $((B^{3+}+Si^{4+})/(La^{3+}+Gd^{3+}+Y^{3+})$ is 1.4 to 1.7;
   the cation ratio of $(B^{3+}/(Ti^{4+}+Nb^{5+}Ta^{5+}+W^{6+}))$ is 2.20 to 2.62;
   the cation ratio of $((B^{3+}+Si^{4+})/(Ti^{4+}+Nb^{5+}Ta^{5+}+W^{6+}))$ is 2.3 to 3.0;
   the cation ratio of $(Zn^{2+}/(Zn^{2+}+Mg^{2+}+Ca^{2+}+Sr^{2+}+Ba^{2+}))$ is 1.0;
   the cation ratio of $((La^{3+}+Gd^{3+}+Y^{3+})/(Ti^{4+}+Nb^{5+}Ta^{5+}+W^{6+}))$ is 1.6 to 2.1;
   the cation ratio of $Ti^{4+}/W^{6+}$ is 0.1 to 1.9; and
   the cation ratio of $((Ti^{4+}+W^{6+})/(Ti^{4+}+Nb^{5+}Ta^{5+}+W^{6+}))$ is 1.0.

5. The optical glass according to claim 1, wherein the $Si^{4+}$ content is 4 to 5%.

6. The optical glass according to claim 1, wherein the glass transition temperature is less than 630° C.

7. The optical glass according to claim 1, wherein the liquidus temperature is 1,200° C. or lower.

8. The optical glass according to claim 1, wherein the liquidus temperature is 1,050° C. or lower and the refractive index nd is 1.90 or higher.

9. The optical glass according to claim 1, wherein the partial dispersion ratio Pg,F is 0.57 to 0.62.

10. An optical element comprised of the optical glass according to claim 1.

11. A preform for precision press molding, comprised of the optical glass according to claim 1.

12. A method for manufacturing an optical element, comprised of heating the preform for precision press molding according to claim 11 and employing a pressing mold to conduct precision press molding.

* * * * *